US010066428B2

(12) United States Patent
Wheelwright

(10) Patent No.: US 10,066,428 B2
(45) Date of Patent: Sep. 4, 2018

(54) CHILD PROOF CUPBOARD CLOSURE

(71) Applicant: Troy Wheelwright, Amesbury, MA (US)

(72) Inventor: Troy Wheelwright, Amesbury, MA (US)

(*) Notice: Subject to any disclaimer, the term of this patent is extended or adjusted under 35 U.S.C. 154(b) by 89 days.

(21) Appl. No.: 14/704,441

(22) Filed: May 5, 2015

(65) Prior Publication Data
US 2015/0267447 A1 Sep. 24, 2015

Related U.S. Application Data

(62) Division of application No. 13/537,279, filed on Jun. 29, 2012.

(60) Provisional application No. 61/503,793, filed on Jul. 1, 2011.

(51) Int. Cl.
*E05C 19/18* (2006.01)
*E05B 65/00* (2006.01)
*F16G 11/03* (2006.01)
*E05C 7/00* (2006.01)

(52) U.S. Cl.
CPC ........ *E05C 19/188* (2013.01); *E05B 65/0014* (2013.01); *E05C 19/184* (2013.01); *F16G 11/03* (2013.01); *E05C 7/00* (2013.01); *Y10T 24/3969* (2015.01); *Y10T 292/17* (2015.04); *Y10T 292/34* (2015.04); *Y10T 292/854* (2015.04)

(58) Field of Classification Search
CPC .. E05B 65/0014; E05B 73/0005; E05B 65/44; E05C 19/188; E05C 7/00; E05C 7/04; E05C 19/18; E05C 19/184; E05C 19/186; F16G 11/03; Y10T 24/3969; Y10T 24/3996; Y10T 24/3993; Y10T 24/3987; Y10T 24/1374; Y10T 292/34; Y10T 292/03; Y10T 292/087; Y10T 292/0872; Y10T 292/0874; Y10T 292/17; Y10S 292/60; Y10S 292/15; Y10S 292/37; B65D 33/28; B65D 55/02; A45C 13/1046
USPC .... 292/288, 1, 246, DIG. 60, 248, 249, 253, 292/DIG. 15, DIG. 37; 70/14, 18, 30, 49, 70/58; 24/136 R, 136 L, 115 M, 115 H, 24/3.4, 115 G; 383/74
See application file for complete search history.

(56) References Cited

U.S. PATENT DOCUMENTS

| 297,158 A | | 4/1884 | Pitney | 24/136 R |
|---|---|---|---|---|
| 307,806 A | * | 11/1884 | Sailer | F16G 11/04 24/115 R |
| 432,539 A | * | 7/1890 | Mains | F16G 11/10 24/134 KB |

(Continued)

*Primary Examiner* — Kristina Rose Fulton
*Assistant Examiner* — Christine M Mills

(57) ABSTRACT

A cabinet closure device is made from a section of cord and utilizes two cord stop devices to form a loop of cord that is adjustable and securable around two objects to be secured. A user slides the closure device around two objects and then pulls on both of the loop ends to secure the closure device around the objects. To release the closure device, the user need only release the cord stops and the closure device will be loosen and the objects released. For the best function, the knot on the end of the cord that does not have the cord stop should be pulled tight against the main cord stop. Once the unit is placed around the knobs of a cabinet, the user can simply pull the $2^{nd}$ cord to tighten the device. Once tight, the additional cord stop can be slid upwards abutting the main cord stop.

6 Claims, 2 Drawing Sheets

(56) References Cited

U.S. PATENT DOCUMENTS

| | | | | |
|---|---|---|---|---|
| 1,379,093 A | * | 5/1921 | Freeberg | F21V 21/16 24/115 G |
| 2,164,206 A | * | 6/1939 | Gits | E06B 9/326 16/442 |
| 2,832,116 A | * | 4/1958 | Clevett, Jr. | B65D 63/14 24/115 H |
| 3,564,670 A | * | 2/1971 | Bengtsson | A44B 99/00 403/390 |
| 3,698,042 A | * | 10/1972 | Hirschhorn | F16G 11/048 24/115 G |
| 3,845,575 A | * | 11/1974 | Boden | A43C 7/00 24/115 M |
| 3,897,161 A | * | 7/1975 | Reinwall, Jr. | F16G 11/04 24/115 R |
| 4,156,574 A | * | 5/1979 | Boden | F16G 11/10 24/115 M |
| 4,288,891 A | * | 9/1981 | Boden | F16G 11/10 24/115 G |
| 4,379,358 A | * | 4/1983 | Wibrow | F16G 11/00 24/115 M |
| 4,416,477 A | | 11/1983 | Bialobrzeski et al. | |
| D272,715 S | | 2/1984 | Bailey | |
| 4,665,590 A | | 5/1987 | Udelhofen et al. | 24/115 H |
| 4,715,628 A | | 12/1987 | Brink et al. | |
| 4,715,629 A | | 12/1987 | Robinson | |
| 4,717,184 A | | 1/1988 | Boyce | |
| 4,788,755 A | * | 12/1988 | Kasai | A45C 13/30 24/136 A |
| 4,807,333 A | * | 2/1989 | Boden | A43C 7/08 24/136 R |
| 4,878,269 A | * | 11/1989 | Anscher | F16G 11/00 24/115 G |
| 5,230,541 A | | 7/1993 | Nowak | |
| D338,150 S | | 8/1993 | McLinden et al. | |
| 5,294,160 A | * | 3/1994 | Arthur | E05C 19/18 292/258 |
| 5,345,657 A | * | 9/1994 | Shimizu | F16G 11/10 24/115 G |
| 5,365,641 A | * | 11/1994 | Watanabe | A45C 13/1046 24/115 G |
| 5,387,018 A | | 2/1995 | Pinkerton | |
| 5,394,579 A | * | 3/1995 | Walters | A47C 21/022 24/115 G |
| 5,454,140 A | * | 10/1995 | Murai | F16G 11/10 24/115 H |
| 5,572,770 A | * | 11/1996 | Boden | F16G 11/10 24/136 R |
| 5,588,687 A | | 12/1996 | Pinkerton | |
| 5,611,118 A | * | 3/1997 | Bibbee | A42B 7/00 2/195.1 |
| 5,626,372 A | | 5/1997 | Vogt | |
| 5,666,699 A | * | 9/1997 | Takahashi | F16G 11/10 24/115 G |
| 5,709,422 A | * | 1/1998 | Malone | E05C 19/18 292/246 |
| 5,711,554 A | | 1/1998 | Brown et al. | |
| 5,823,649 A | | 10/1998 | Hinrichs | |
| 5,895,080 A | | 4/1999 | Drumheller | |
| 5,906,421 A | | 5/1999 | Floyd | |
| 5,975,593 A | | 11/1999 | Cress | |
| 6,000,735 A | | 12/1999 | Jourdenais | |
| 6,036,066 A | * | 3/2000 | Giacona, III | A45C 13/30 224/148.6 |
| 6,352,290 B1 | | 3/2002 | Scottino | |
| 6,431,616 B1 | | 8/2002 | Julian | |
| D471,076 S | | 3/2003 | Radel | |
| 6,942,257 B2 | | 9/2005 | Wong et al. | |
| 7,100,405 B2 | | 9/2006 | West | |
| 7,261,329 B1 | | 8/2007 | Julian et al. | |
| 7,331,617 B2 | | 2/2008 | Johnson | |
| 7,344,209 B1 | | 3/2008 | Miyashiro | |
| 7,537,250 B1 | | 5/2009 | Gustafson | |
| D617,626 S | | 6/2010 | David | |
| 8,056,989 B2 | | 11/2011 | Zielinski | |
| 8,313,128 B2 | * | 11/2012 | Belyea | E05B 13/00 292/258 |
| 8,851,535 B2 | * | 10/2014 | Miskel | E05C 19/186 292/258 |
| 8,904,605 B2 | * | 12/2014 | Kawaguchi | F16G 11/101 24/115 G |
| 9,296,524 B2 | * | 3/2016 | Woloveck | B65D 33/28 |
| 9,643,765 B2 | * | 5/2017 | Pivonka | B65D 63/109 |
| 2005/0268436 A1 | * | 12/2005 | Yoshiguchi | F16G 11/10 24/115 G |
| 2006/0152018 A1 | | 7/2006 | Crossley | |
| 2008/0115334 A1 | * | 5/2008 | Chen | A43C 1/00 24/115 G |
| 2009/0094798 A1 | * | 4/2009 | Yao | A43C 1/00 24/115 G |
| 2012/0088214 A1 | * | 4/2012 | Brodbeck | A63B 69/12 434/254 |

\* cited by examiner

CHILD PROOF CUPBOARD CLOSURE

CROSS-REFERENCE TO RELATED APPLICATIONS

This application is a divisional application of U.S. patent application Ser. No. 13/537,279 filed Jun. 29, 2012 titled "CHILD PROOF CUPBOARD CLOSURE", which in turn claims priority from U.S. Provisional Patent No. 61/503,793, which was filed on Jul. 1, 2011 titled "CHILD PROOF CUPBOARD CLOSURE", both of which are incorporated fully herein by reference.

TECHNICAL FIELD

The present invention relates to child proofing cabinets and more particularly, relates to a closure device that fits essentially all cabinets and storage devices that have knobs.

BACKGROUND INFORMATION

Cabinets as well as other storage devices which have doors and are at a level accessible to children must often be "child proofed" to prevent children from accessing the contents of the cabinet or storage device to prevent access to other dangerous materials or materials that the homeowner does not wish children to access.

Prior art devices designed to "child proof" cabinets have typically been hard plastic devices. These devices are sometimes difficult to use (sometimes requiring two hands to set and/or unset); are large enough such that they do not fit behind many door knobs, and almost certainly do not allow for their use around corners such is required for a corner cupboard.

Accordingly, what is needed is a childproof cupboard closure that is easy to use (can be operated with one hand) can sit behind almost any knob and will work around a corner cupboard.

SUMMARY OF THE INVENTION

The present invention features a flexible cord securing device configured for preventing movement of first and second objects. The flexible cord securing device comprises a length of flexible cord, wherein the length of flexible cord has a first end and a second end. At least a first flexible cord securing device has a first opening configured for receiving a first end of the flexible cord, and a second opening configured for receiving the second end of the flexible cord.

The at least a first flexible cord securing device further includes a flexible cord locking mechanism, operative in one of a first position and a second position, wherein the first position secures the first and second ends of the flexible cord from sliding in and out of the flexible cord securing device, and wherein the second position of the flexible cord locking mechanism allows the first and second ends of the flexible cord to slide through the first and second openings of the flexible cord securing device.

The flexible cord locking mechanism is coupled to an engagement device disposed on an exterior surface of the at least a first flexible cord securing device, the flexible cord locking mechanism engagement device is configured for causing the flexible cord locking mechanism to operate in one of the first or second positions thereby allowing the flexible cord to be adjusted and secured around the first and second objects to be secured.

In the preferred embodiment, each of the first and second ends of the length of flexible cord include a flexible cord end cover device configured for covering a knot tied in each of the first and second ends of the flexible cord. The flexible cord and cover devices include a smaller aperture at a proximal end and a larger aperture at a distal end such that the larger aperture of the distal end can be pulled over the knot tied in each of the first and second ends of the flexible cord, to provide an aesthetically pleasing and functionally useful grip.

The flexible cord securing device further includes a second flexible cord securing device. The second flexible cord securing device is disposed about one of the first or second ends of the flexible cable between the at least a first flexible cord securing device and a terminal end of the first or second end of the flexible cord. The second flexible cord securing device has a first opening configured for receiving one of the first or second ends of the flexible cord. The second flexible cord securing device further includes a flexible cord locking mechanism, operative in one of a first position and a second position. The first position secures the one of the first or second ends of the flexible cord from sliding in and out of the second flexible cord securing device. The second position of the flexible cord locking mechanism allows the one of the first or second ends of the flexible cord to slide in and out of the second flexible cord securing device. The flexible cord locking mechanism is coupled to an engagement device disposed on an exterior surface of the at least a first flexible cord securing device. The flexible cord locking mechanism engagement device is configured for causing the flexible cord locking mechanism to operate in one of a first or second positions.

The flexible cord locking mechanism engagement device may include a region configured to be depressed and released or a device configured to be slid within a slot.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

The present invention features a childproof cabinet strap for use in childproof think cabinets having circular or other shaped knobs or handles that have no hole or space through or around which one of the prior art cabinet "lock" cannot be inserted. The drawings show exemplary devices that are constructed according to the invention and that constitute the best modes for carrying out the invention currently known to the applicant.

Figure 2:
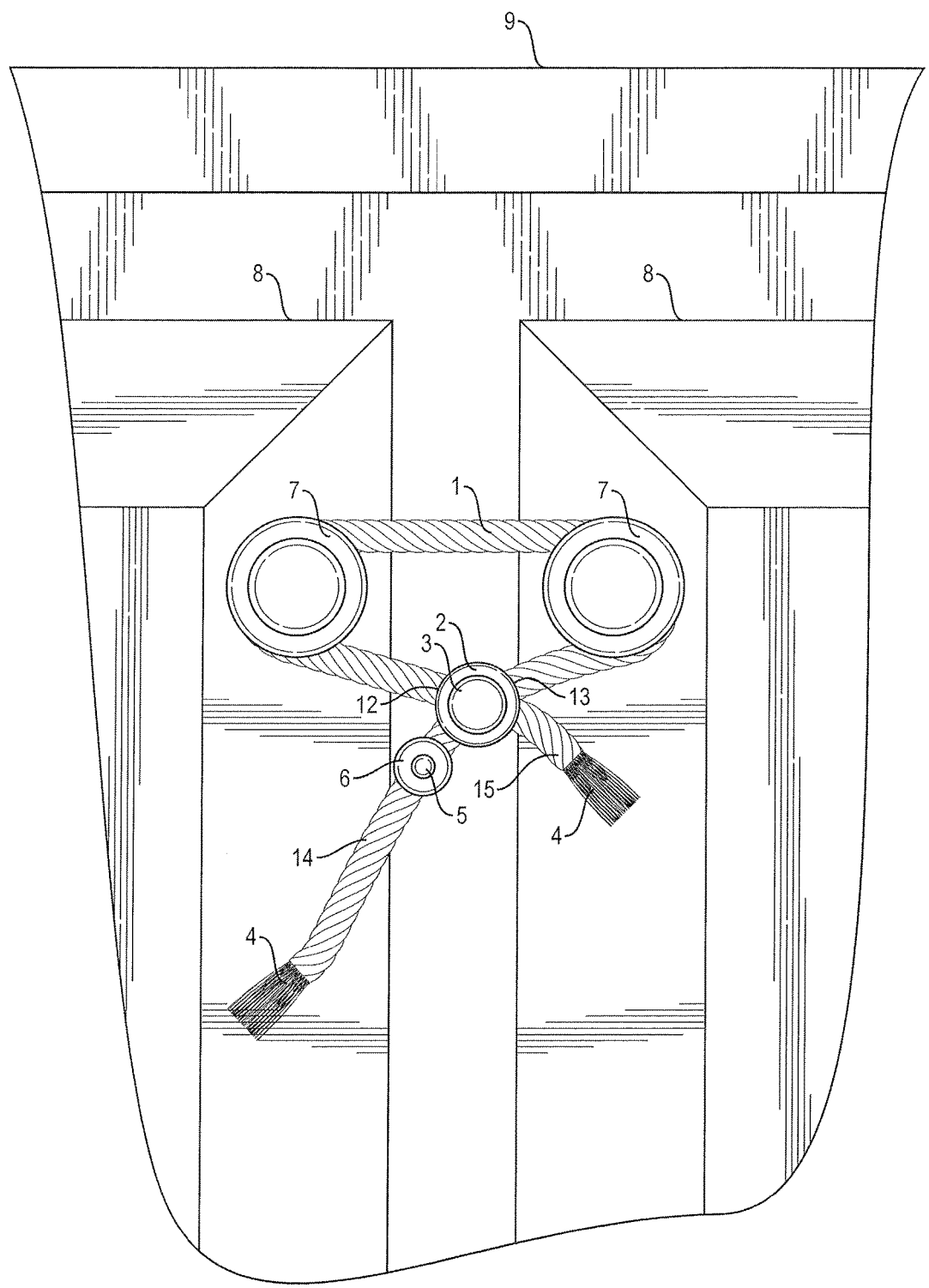
FIG. 2 is a pictorial view of the preferred embodiment of the childproof cabinet strap in use and secured to the knobs of a cabinet.

It is anticipated that the primary use of the invention will be for cabinets that have knobs that are proximate or near each other on separate doors of the type shown in FIG. 2 and similar cabinets. However, it is intended to be understood that the device may also be used to advantage in connection with other types of cabinets and other types of structures enclosing storage areas. For example, in some circumstances, the childproof device according to the present invention could be used in conjunction with a drawer and with a set of cabinet doors that are arranged around a corner 90 degrees from one another.

Figure 1:
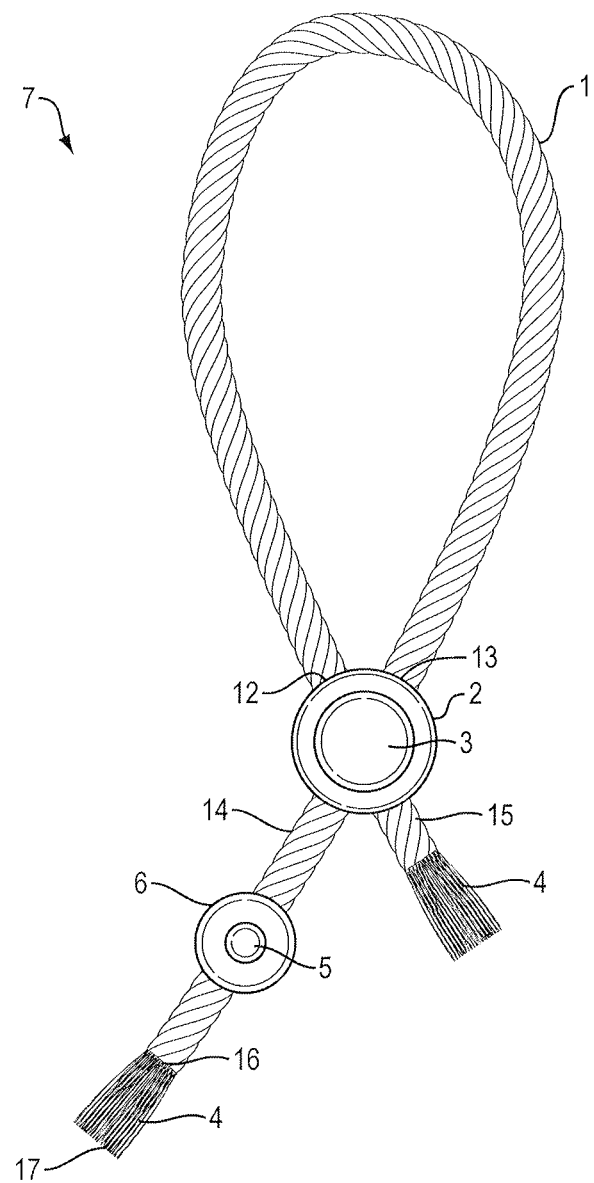
FIG. 1 is a pictorial view of the preferred embodiment of the childproof cabinet strap according to the present invention.

Referring to FIGS. 1-2, the first and preferred embodiment of the device includes a length of nylon cord 1, with a first end 14 running through a first 13 of two holes 12/13 in a two holed, spring loaded/push button type cord stop device 2, of the type normally referred to in the art as a two-hole push button paracord stop and a second end 15 running through the remaining second hole 12 in the same cord stop device 2, such that the nylon cord 1, forms a loop shown generally at 7. The free ends 15 and 14 each have a cord end cover device 4 that may have a smaller aperture at the proximal end 16, and a larger aperture at the distal end 17, such that a knot can be tied at each of the ends of the cord 1, and the cord end 4 can then be pulled over the knot to provide an aesthetically pleasing and functionally useful grip.

One free end 14 of the cord 1 further includes an additional smaller but similar cord stop 6, with only one hole that is slidably engaged on the free end 14. The distal end of free end 14 has a cord end 4, secured over a knot tied at the end of the nylon cord 1 the same as that described for the opposite free end 15. The second cord stop 6 provides additional security against a child pulling the first cord stop 2 loose.

For the best function, the end of the cord 15 that does not have the $2^{nd}$ cord stop 6 should be released such that the cord end 4 is tight against the main cord stop 2. Once the unit 1 is placed around the knobs of a cabinet, the user can simply depress cord stop release 3 on the main cord stop 2 and then pull the $2^{nd}$ cord end 14 to tighten the device 1 around the cabinet knobs as shown in FIG. 2. Once tight, the additional cord stop 6 can be slid upwards to a position near or abutting the main cord stop 2 by depressing cord stop release 5 on the second cord stop 6. In this configuration, the cord is locked on both ends securely and cannot be forced open (see FIG. 2).

Accordingly, the present invention provides an inexpensive and novel mechanism by which to secure or "childproof" various areas such as drawers, cabinets or the like. Because the device of the present invention is made from a soft, non-abrasive materials such as a nylon or similar cord material, there is no danger that cabinet or drawer fronts will be scratched or damaged by hard plastic or metal objects as a child or other person poles or moves the childproof device. The flexibility of the nylon cord also allows the present invention to be utilized in nontraditional areas such as between 2 cabinet doors that are arranged 90° to one another and for which the prior art devices are inoperative; on or in connection with oven doors; refrigerator doors; and almost any other door or drawer which is desired to be protected.

Modifications and substitutions by one of ordinary skill in the art are considered to be within the scope of the present invention, which is not to be limited except by the allowed claims and their legal equivalents.

What is claimed is:

1. A flexible cord securing device, configured for engaging with first and second objects, for generally preventing movement of the first and second objects, said flexible cord securing device consisting of:

a length of flexible cord, a first flexible cord securing device and a second flexible cord securing device;

said length of flexible cord having a first end and a second end and a middle section between said first end and said second end, at least a portion of said middle section of said length of flexible cord configured to be removably placed around said first and second objects;

said first flexible cord securing device consisting of a first opening, a second opening and a flexible cord locking mechanism, said first opening extending in a straight line path through said first flexible cord securing device from a first side region of said first flexible cord securing device to a second side region of said first flexible cord securing device directly opposite said first side region, said first opening configured for receiving said first end of said flexible cord, and said second opening extending in a straight line path through said first flexible cord securing device from a third side region of said first flexible cord securing device to a fourth side region of said first flexible cord securing device directly opposite said third side region, said second opening configured for receiving a portion of said middle section of said length of flexible cord proximate said second end of said flexible cord, said flexible cord locking mechanism operative in one of a first flexible cord securing position and a second user activated flexible cord releasing position, said flexible cord locking mechanism normally disposed in said first flexible cord securing position, wherein said first flexible cord securing position of said flexible cord locking mechanism secures said first end and said portion of said middle section of said flexible cord from sliding in and out of said first flexible cord securing device, and wherein said second user activated flexible cord releasing position of said first flexible cord locking mechanism allows said first end and said portion of said middle section of said flexible cord to slide through said first opening and said second opening of said first flexible cord securing device, said flexible cord locking mechanism coupled to an engagement device disposed on an exterior surface of said first flexible cord securing device, said engagement device configured for causing said flexible cord locking mechanism to move from said first flexible cord securing position to said second user activated flexible cord releasing position, thereby allowing a loop of said flexible cord formed by said length of flexible cord inserted into said first flexible cord securing device to be adjusted in length and secured around said first and second objects to be secured;

said second flexible cord securing device disposed about one of said first end or said second end of said flexible cord between said first flexible cord securing device and a terminal end of one of said first end or said second end of said length of flexible cord, said second flexible cord securing device consisting of an opening extending in a straight line path through said second flexible cord securing device from a first side region of said second flexible cord securing device to a second side region of said second flexible cord securing device directly opposite said first side region and a flexible cord locking mechanism, said second flexible cord securing device configured for receiving only one of said first end or said second end of said flexible cord and through which said only one of said first end or said second end of said flexible cord is configured for passing completely through said second flexible cord securing device, said flexible cord locking mechanism operative in one of a first flexible cord securing position and a second user activated flexible cord releasing position, said flexible cord locking mechanism normally disposed in said first flexible cord securing position, wherein said first flexible cord securing position of said flexible cord locking mechanism secures said only one of said first end or said second end of said flexible cord from sliding in and out of said second flexible cord securing device, and wherein said second user activated flexible cord releasing position of said flexible cord locking mechanism allows said only one of said first end or said second end of said flexible cord to slide in and out of said second flexible cord securing device, said flexible cord locking mechanism coupled to an engagement device disposed on an exterior surface of said second flexible cord securing device, said engagement device configured for causing said flexible cord locking mechanism to operate in one of said first flexible cord securing position or said second user activated flexible cord releasing position; and wherein said first flexible cord securing device is disposed on said flexible cord in closer proximity to said first and second objects than said second flexible cord securing device, and wherein said second flexible cord securing device is configured for being disposed abutting said first flexible cord securing device after said loop of said flexible cord formed by said length of flexible cord inserted into said first flexible cord securing device is adjusted in length and secured around said first and second objects to be secured.

2. The flexible cord securing device of claim 1, wherein each engagement device includes a region configured to be depressed and released.

3. The flexible cord securing device of claim 1, wherein each of said first end and said second end of said length of flexible cord include a flexible cord end cover device, configured for covering a knot tied in each of said first end and said second end of said flexible cord.

4. The flexible cord securing device of claim 3, wherein said flexible cord end cover devices include a smaller aperture at a proximal end and a larger aperture at a distal end such that said larger aperture of said distal end can be pulled over the knot tied in each of said first end and said second end of said flexible cord to provide an aesthetically pleasing and functionally useful grip.

5. A flexible cord securing device, configured for engaging with first and second objects, for generally preventing movement of the first and second objects, said flexible cord securing device consisting of:
  a length of flexible cord, a first flexible cord securing device and a second flexible cord securing device;
  said length of flexible cord having a first end, a second end and a middle section between said first end and said second end, at least a portion of said middle section of said length of flexible cord configured to be removably placed around said first and second objects, wherein each of said first end and said second end of said length of flexible cord include a flexible cord end cover device, configured for covering a knot tied in each of said first end and said second end of said flexible cord;
  said first flexible cord securing device consisting of a first opening, a second opening and a flexible cord locking mechanism, said first opening extending in a straight line path through said first flexible cord securing device from a first side region of said first flexible cord securing device to a second side region of said first flexible cord securing device directly opposite said first side region, said first opening configured for receiving said first end of said flexible cord, and said second opening extending in a straight line path through said first flexible cord securing device from a third side region of said first flexible cord securing device to a fourth side region of said first flexible cord securing device directly opposite said third side region, said second flexible cord securing device configured for receiving a portion of said middle section of said length of flexible cord proximate said second end of said flexible cord, said flexible cord locking mechanism operative in one of a first flexible cord securing position and a second user activated flexible cord releasing position, said flexible cord locking mechanism normally disposed in said first flexible cord securing position wherein said first flexible cord securing position of said flexible cord locking mechanism secures said first end and said portion of said middle section of said flexible cord from sliding in and out of said first flexible cord securing device, and wherein said second user activated flexible cord releasing position of said flexible cord locking mechanism allows said first end and said portion of said middle section of said flexible cord to slide through said first opening and said second opening of said first flexible cord securing device, said flexible cord locking mechanism coupled to a first engagement device disposed on an exterior surface of said first flexible cord securing device, said first engagement device configured for causing said flexible cord locking mechanism to move from said first flexible cord securing position to said second user activated flexible cord releasing position, thereby allowing a loop of said flexible cord formed by said length of flexible cord inserted into said first flexible cord securing device to be adjusted in length and secured around said first and second objects to be secured;

said second flexible cord securing device disposed about one of said first end or said second end of said flexible cord between said first flexible cord securing device and a terminal end of one of said first end or said second end of said length of flexible cord, said second flexible cord securing device consisting of an opening extending in a straight line path through said second flexible cord securing device from a first side region of said second flexible cord securing device to a second side region of said second flexible cord securing device directly opposite said first side region, and a flexible cord locking mechanism, said second flexible cord securing device configured for receiving only one of said first end or said second end of said flexible cord and through which said only one of said first end or said second end of said flexible cord is configured for passing completely through, said flexible cord locking mechanism operative in one of a first flexible cord securing position and a second user activated flexible cord releasing position, said flexible cord locking mechanism normally disposed in said first flexible cord securing position, wherein said first flexible cord securing position secures said only one of said first end or said second end of said flexible cord from sliding in and out of said second flexible cord securing device, and wherein said second user activated flexible cord releasing position of said flexible cord locking mechanism allows said only one of said first end or said second end of said flexible cord to slide in and out of said second flexible cord securing device, said flexible cord locking mechanism coupled to a second engagement device disposed on an exterior surface of said second flexible cord securing device, said second engagement device configured for causing said flexible cord locking mechanism to operate in one of said first flexible cord securing position or said second user activated flexible cord releasing position; and wherein said first flexible cord securing device is disposed on said flexible cord in closer proximity to said first and second objects than said second flexible cord securing device, wherein said second flexible cord securing device is disposed abutting said first flexible cord securing device after said loop of said flexible cord formed by said length of flexible cord inserted into said first flexible cord securing device is adjusted in length and secured around said first and second objects to be secured, and wherein one of said flexible cord end cover devices of one of said first end and second end of said length of flexible cord is disposed against said first flexible cord securing device.

6. A flexible cord securing device, configured for engaging with first and second separate and discrete objects, for generally preventing movement of the first and second separate and discrete objects, said flexible cord securing device consisting of:

a length of flexible cord, a first flexible cord securing device and a second flexible cord securing device;

said length of flexible cord having a first end and a second end and a middle section between said first end and said second end;

said first flexible cord securing device consisting of a first opening, and a second opening and a flexible cord locking mechanism, said first opening extending in a straight line path through said first flexible cord securing device from a first side region of said first flexible cord securing device to a second side region of said first flexible cord securing device directly opposite said first side region, said first opening configured for receiving said first end of said flexible cord, and said second opening configured for receiving a portion of said middle section of said length of flexible cord proximate said second end of said flexible cord, said flexible cord locking mechanism operative in one of a first flexible cord securing position and a second user activated flexible cord releasing position, said flexible cord locking mechanism normally disposed in said first flexible cord securing position, wherein said first flexible cord securing position of said flexible cord locking mechanism secures said first end and said middle section of said flexible cord from sliding in and out of said first flexible cord securing device, and wherein said second user activated flexible cord releasing position of said flexible cord locking mechanism allows said first end and said portion of said middle section of said flexible cord to slide through said first opening and said second opening of said first flexible cord securing device, said flexible cord locking mechanism coupled to an engagement device disposed on an exterior surface of said first flexible cord securing device, said engagement device configured for causing said flexible cord locking mechanism to move from said first flexible cord securing position to said second user activated flexible cord releasing position, thereby allowing a loop of said flexible cord formed by said length of flexible cord inserted into said first flexible cord securing device to be adjusted in length and secured around said first and second separate and discrete objects to be secured;

said second flexible cord securing device disposed about one of said first end or said second end of said flexible cord between said first flexible cord securing device and a terminal end of one of said first end or said second end of said length of flexible cord, said second flexible cord securing device consisting of an opening extending in a straight line path through said second flexible cord securing device from a first side region of said second flexible cord securing device to a second side region of said second flexible cord securing device directly opposite said first side region and a flexible cord locking mechanism, said second flexible cord securing device configured for receiving only one of said first end or said second end of said flexible cord and through which said only one of said first end or said second end of said flexible cord is configured for passing completely through said second flexible cord securing device, said flexible cord locking mechanism operative in one of a first flexible cord securing position and a second user activated flexible cord releasing position, said flexible cord locking mechanism normally disposed in said first flexible cord securing position, wherein said first flexible cord securing position of said flexible cord locking mechanism secures said only one of said first end or said second end of said flexible cord from sliding in and out of said second flexible cord securing device, and wherein said second user activated flexible cord releasing position of said flexible cord locking mechanism allows said only one of said first end or said second end of said flexible cord to slide in and out of said second flexible cord securing device, said flexible cord locking mechanism coupled to a second engagement device disposed on an exterior surface of said second flexible cord securing device, said second engagement device configured for causing said flexible cord locking mechanism to operate in one of said first flexible cord securing position or said second user activated flexible cord releasing position; and wherein said first flexible cord securing device is disposed on said flexible cord in closer proximity to said first and second separate and discrete objects than said second flexible cord securing device, and wherein said second flexible cord securing device is configured for being disposed abutting said first flexible cord securing device after said loop of said flexible cord formed by said length of flexible cord inserted into said first flexible cord securing device is adjusted in length and secured around said first and second separate and discrete objects to be secured.

* * * * *